US007821716B2

(12) United States Patent
Staub et al.

(10) Patent No.: US 7,821,716 B2
(45) Date of Patent: Oct. 26, 2010

(54) METHOD FOR PRODUCING A MULTILAYER BODY AND CORRESPONDING MULTILAYER BODY

(75) Inventors: Rene Staub, Hagendorn (CH); Wayne Robert Tompkin, Baden (CH); Andreas Schilling, Hagendorn (ZG) (CH)

(73) Assignee: OVD Kinegram AG, Zug (CH)

(*) Notice: Subject to any disclaimer, the term of this patent is extended or adjusted under 35 U.S.C. 154(b) by 576 days.

(21) Appl. No.: 11/883,990

(22) PCT Filed: Feb. 9, 2006

(86) PCT No.: PCT/EP2006/001126

§ 371 (c)(1), (2), (4) Date: Sep. 17, 2007

(87) PCT Pub. No.: WO2006/084685

PCT Pub. Date: Aug. 17, 2006

(65) Prior Publication Data

US 2008/0310025 A1 Dec. 18, 2008

(30) Foreign Application Priority Data

Feb. 10, 2005 (DE) ....................... 10 2005 006 231

(51) Int. Cl.
*G02B 5/18* (2006.01)

(52) U.S. Cl. ....................................... 359/576; 359/900

(58) Field of Classification Search ................. 359/576, 359/900; 380/54
See application file for complete search history.

(56) References Cited

U.S. PATENT DOCUMENTS

| | | | | |
|---|---|---|---|---|
| 4,882,477 | A | 11/1989 | Oogita et al. | |
| 5,948,199 | A * | 9/1999 | McGrew | 156/231 |
| 6,294,267 | B1 * | 9/2001 | Benoit | 428/515 |
| 6,495,231 | B2 * | 12/2002 | Benoit et al. | 428/46 |
| 6,507,441 | B1 * | 1/2003 | Eisenberg et al. | 359/627 |
| 6,906,861 | B2 * | 6/2005 | Tompkin et al. | 359/567 |
| 7,101,644 | B2 * | 9/2006 | Toshine et al. | 430/1 |
| 7,680,274 | B2 * | 3/2010 | Tompkin et al. | 380/54 |

(Continued)

FOREIGN PATENT DOCUMENTS

| | | |
|---|---|---|
| DE | 41 30 896 | 7/1992 |

(Continued)

*Primary Examiner*—Frank G Font
(74) *Attorney, Agent, or Firm*—Hoffman & Baron, LLP

(57) ABSTRACT

There is described a process for the production of a multi-layer body (100) having a partially shaped first layer (3*m*), wherein it is provided that in the process a diffractive first relief structure (4) with a high depth-to-width ratio of the individual structure elements, in particular with a depth-to-width ratio of >0.3, is shaped in a first region (5) of a replication layer (3) of the multi-layer body (100) and the first layer (3*m*) is applied to the replication layer (3) in the first region (5) and in a second region (4, 6) in which the relief structure is not shaped in the replication layer (3), with a constant surface density, and the first layer (3*m*) is partially removed in a manner determined by the first relief structure so that the first layer (3*m*) is partially removed in the first region (5) or in the second region (4, 6) but not in the second region (4, 6) or in the first region (5) respectively.

39 Claims, 11 Drawing Sheets

U.S. PATENT DOCUMENTS

| | | | | |
|---|---|---|---|---|
| 2005/0063027 | A1* | 3/2005 | Durst et al. | 359/2 |
| 2006/0164249 | A1 | 7/2006 | Lutz et al. | |
| 2006/0209412 | A1 | 9/2006 | Schilling et al. | |
| 2006/0251863 | A1 | 11/2006 | Katschorek et al. | |

FOREIGN PATENT DOCUMENTS

| | | |
|---|---|---|
| DE | 103 18 157 | 11/2004 |
| DE | 103 28 760 | 1/2005 |
| DE | 103 33 704 | 4/2005 |
| EP | 0 216 947 | 4/1987 |
| EP | 0 372 274 | 6/1990 |
| EP | 0 537 439 | 4/1993 |
| EP | 0 758 587 | 2/1997 |
| GB | 2 136 352 | 9/1984 |
| RU | 2207960 | 7/2003 |
| WO | WO 93/11510 | 6/1993 |
| WO | WO9965699 | 12/1999 |
| WO | WO 01/03945 | 1/2001 |

* cited by examiner

METHOD FOR PRODUCING A MULTILAYER BODY AND CORRESPONDING MULTILAYER BODY

This application claims priority based on an International Application filed under the Patent Cooperation Treaty, PCT/EP2006/001126, filed on Feb. 9, 2006 and German Application No. 102005006231.8-45, filed on Feb. 10, 2005.

FIELD OF THE INVENTION

The invention concerns a process for the production of a multi-layer body having a partially shaped first layer and a multi-layer body having a replication layer and a first layer partially arranged on the replication layer.

Such components are suitable as optical components or also as lens systems in the field of telecommunications.

BACKGROUND OF THE INVENTION

GB 2 136 352 A describes a production process for the production of a sealing film provided with a hologram as a security feature. In that case after the operation of embossing a diffractive relief structure a plastic film is metallised over its full area and then demetallised in region-wise fashion in accurate register relationship with the embossed diffractive relief structure.

Demetallisation in accurate register relationship is costly and the degree of resolution which can be achieved is limited by the adjustment tolerances and the procedure employed.

EP 0 537 439 B2 describes processes for the production of a security element with filigree patterns. The patterns are formed from diffractive structures covered with a metal layer and surrounded by transparent regions in which the metal layer is removed. It is provided that the outline of the filigree pattern is introduced in the form of a depression into a metal-coated carrier material, in that case at the same time the bottom of the depressions is provided with the diffractive structures and then the depressions are filled with a protective lacquer. Excess protective lacquer is to be removed by means of a scraper blade.

After application of the protective lacquer, it is provided that the metal layer is removed by etching in the unprotected transparent regions. The depressions are between about 1 μm and 5 μm while the diffractive structures can involve height differences of more than 1 μm. That process which, in repetition steps, requires adjustment steps for orientation in accurate register relationship, fails when dealing with finer structures. In addition continuous metallic regions covering an area are difficult to implement as the 'spacers' are missing, for the operation of scraping off the protective lacquer.

SUMMARY OF THE INVENTION

The object of the present invention is to provide a multi-layer body and a process for the production of a multi-layer body, in which a layer which has regions in which the layer is not present can be applied in register relationship with a high level of accuracy and inexpensively.

In accordance with the invention that object is attained by a process for the production of a multi-layer body having a partially shaped first layer, wherein it is provided that a diffractive first relief structure with a high depth-to-width ratio of the individual structure elements, in particular with a depth-to-width ratio of >0.3, is shaped in a first region of a replication layer of the multi-layer body, and the first layer is applied to the replication layer in the first region and in a second region in which the first relief structure is not shaped in the replication layer, with a constant surface density with respect to a plane defined by the replication layer, and the first layer is partially removed in a manner determined by the first structure, so that the first layer is removed in the first region but not in the second region or in the second region but not in the first region.

The object is further attained by a multi-layer body having a replication layer and at least one first layer partially arranged on the replication layer, wherein it is provided that a diffractive first relief structure with a high depth-to-width ratio of the individual structure elements, in particular with a depth-to-width ratio of >0.3, is shaped in a first region of the replication layer, the first relief structure is not shaped in the replication layer in a second region of the replication layer, and the partial arrangement of the first layer is determined by the first relief structure so that the first layer is removed in the first region but not in the second region or in the second region but not in the first region.

The invention is based on the realisation that the special diffractive relief structure in the first region influences physical properties of the first layer applied to the replication layer in that region such as transmission properties, in particular transparency, or effective thickness of the first layer, so that the physical properties of the first layer differ in the first and second regions. The first layer is now used as a kind of mask layer for partial removal of the first layer itself or for partial removal of a further layer. That affords the advantage, over the mask layers applied with conventional processes, that that mask layer is oriented in accurate register relationship without additional adjustment complication and expenditure. The first layer is an integral component part of the structure which is shaped in the replication layer. A lateral displacement between the first relief structure and regions of the first layer with the same physical properties does not occur. The arrangement of regions of the first layer with the same physical properties is exactly in register relationship with the first relief structure. Accordingly only the tolerances of that relief structure have an influence on the tolerances of the position of the first layer. Additional tolerances do not arise. The first layer is a layer which preferably performs a dual function. On the one hand it implements the function of a highly accurate mask layer, for example a highly accurate exposure mask for the production procedure while on the other hand (at the end of the production procedure) it forms a highly accurately positioned functional layer, for example an OVD layer or a conductor track or a functional layer of an electrical component, for example an organic semiconductor component.

Furthermore it is possible to produce structured layers of very high resolution by means of the invention. The degree of resolution which can be achieved is approximately better by a factor of 100 than those which can be attained by known demetallisation processes. As the width of the structure elements of the first relief structure can be in the region of the wavelength of visible light (between about 380 and 780 nm) but also below same, it is possible to produce metallised pattern regions enjoying very fine contours. That means that in this respect also great advantages are achieved in comparison with the demetallisation processes used hitherto, and it is possible with the invention to produce security elements with a higher level of safeguard against copying and forgery than hitherto.

It is possible to produce lines and/or dots with a high level of resolution, for example of a width or of a diameter respectively of less than 5 μm, in particular to about 200 nm. Preferably levels of resolution in the region of between about 0.5 μm and 5 μm, in particular in the region of about 1 μm, are achieved. In comparison, processes which involve adjustment in register relationship make it possible to implement line widths of less than 10 μm, only at a very high level of complication and expenditure.

The first layer can be a very thin layer of the order of magnitude of some nm. The first layer applied with a uniform surface density, with respect to the plane defined by the replication layer, is considerably thinner in regions with a high depth-to-width ratio than in regions with a low depth-to-width ratio.

The dimensionless depth-to-width ratio is a characteristic feature for enlargement of the surface of preferably periodic structures, for example of a sine-square configuration. The depth here is the spacing between the highest and the lowest successive points of such a structure, that is to say the spacing between a 'peak' and a 'trough'. The spacing between two adjacent highest points, that is to say between two 'peaks', is referred to as the width. Now, the higher the depth-to-width ratio, the correspondingly steeper are the 'peak flanks', and the correspondingly thinner is the first layer which is deposited on the 'peak flanks'. That effect is also observed in the case of a rectangular structure with vertical 'peak' flanks. This however can also involve structures to which this model cannot be applied. By way of example, the situation may involve discretely distributed regions in line form, which are only in the form of a 'trough', wherein the spacing between two 'troughs' is a multiple greater than the depth of the 'troughs'. Upon formal application of the above-specified definition the depth-to-width ratio calculated in that way would be approximately zero and would not reflect the characteristic physical condition. Therefore, in the case of discretely arranged structures which are formed substantially only from a 'trough', the depth of the 'trough' is to be related to the width of the 'trough'.

Such multi-layer bodies are suitable for example as optical components such as lens systems, exposure and projection masks or as security elements for safeguarding documents or ID cards, insofar as they cover critical regions of the document such as a passport picture or a signature of the owner or the entire document. They can also be used as components or decoration elements in the field of telecommunications.

The multi-layer body can be a film element or a rigid body. Film elements are used for example to provide documents, banknotes or the like with security features. That can involve security threads for being woven into paper or for being introduced into a card, which can be formed with the process according to the invention with a partial demetallisation in perfect register relationship with an OVD design.

It has further proven to be desirable if the multi-layer body is arranged in the form of a security feature in a window of a value-bearing document or the like. New security features with a particularly brilliant and filigree appearance can be generated by means of the process according to the invention. Thus it is possible for example to produce images which are semi-transparent in the transillumination mode by forming a rastering of the first layer. Furthermore it is possible for a first item of information to be rendered visible in such a window in the reflection mode and for a second item of information to be rendered visible in the transillumination mode.

Advantageously rigid bodies such as an identity card, a base plate for a sensor element or a housing shell portion for a cell phone can also be provided with the optionally partially demetallised layers according to the invention, which are in register relationship with functional structures or with a diffractive design element. It can be provided that the replication layer is introduced and structured directly with the injection molding tool or by means of shaping with a die using UV lacquer.

Advantageous configurations of the invention are set forth in the appendant claims.

In accordance with a preferred embodiment of the invention first regions in which the diffractive relief structure with a high depth-to-width ratio is provided alternate with second regions in which there is provided an optical active diffractive structure having a conventional, lower depth-to-width ratio. By way of example the first relief structure in the first region is respectively of a depth of 5 μm and a width of 2.5 μm, that is to say a high depth-to-width ratio of 2, and in the second region it is of a depth of 0.15 μm and a width of 2.5 μm, that is to say a low depth-to-width ratio of 0.06.

That makes it possible for the structuring of the first layer and/or one or more further layers to be oriented in accurate register relationship with the optical effects produced by the diffractive structures in the second region, with a very small tolerance. In that respect, instead of a diffractive structure, it is also possible to provide in the second region another optically active microstructure or macrostructure, for example a micro-lens raster. Security elements with a higher level of copying and forgery protection can be produced by the highly accurate orientation, which can be achieved by means of the invention, in respect of partially shaped layers of a security element with optically active relief structures of the security element.

In that way for example filigree patterns such as guilloche patterns can be produced, which are oriented exactly in relation to diffractive structures which correspond to configurational motifs of a hologram or an optically variable security device, known in the art by the trademark KINEGRAM®.

The first layer is applied to the replication layer preferably by means of sputtering, vapor deposition or spraying. In the sputtering operation, due to the procedure involved, a directed application of material takes place so that when applying material of the first layer by sputtering, in a constant surface density with respect to the plane defined by the replication layer, to the replication layer provided with the relief structure, the material is deposited locally in differing thicknesses. Vapor deposition and spraying of the first layer, by virtue of the operating procedure involved, preferably also produces at least partially directed application of material.

In accordance with a preferred embodiment of the invention the first layer is partially removed by a time-controlled etching process. The basic starting point is the fact that relief structures with a high depth-to-width ratio involve a markedly larger surface area than flat surfaces or surfaces with relief structures which have a low depth-to-width ratio. The etching process is terminated when the first layer is completely removed, or at least the layer thickness is reduced, in the regions with a high depth-to-width ratio. The first layer still covers the second layer when the first layer is already completely removed in the first region, by virtue of the different physical properties, governed by the specific relief structure in the first region, of the first layer in the first and second regions (smaller effective thickness). By way of example lyes or acids can be provided as the etching agents. It is however also possible to provide that the first layer is only partially removed and the etching operation is interrupted as soon as a predetermined degree of transmission or transparency is achieved. In that way it is possible for example to produce security features which are based on locally differing transmission or transparency.

If a multi-layer body with a for example vapor-deposited reflection layer as the first layer is exposed to an etching medium which is predominantly isotropic the reflection layer is already completely removed in regions with a high depth-to-width ratio while in regions with a low depth-to-width ratio there is still a residual layer present. If for example aluminum is used as the reflection layer lyes such as NaOH or KOH can be used as the isotropically acting etching agent. It is also possible to use acid media such as PAN (a mixture of phosphoric acid, nitric acid and water).

The reaction speed typically increases with the concentration of the lye and temperature. The choice of the process parameters depends on the reproducibility of the procedure and the resistance of the multi-layer body.

If the first layer is to be opaque after the etching operation in the second region then the optical density is preferably selected there to be >1.5. In order to compensate for the removal of the first layer, which also occurs in the isotropic etching operation in the second regions with a low depth-to-width ratio, it is therefore necessary to start with a correspondingly higher optical density. The compensation can contribute a multiple of the optical density envisaged, depending on the respective differences in the depth-to-width ratio. If for example an Al layer is applied by vapor deposition as the first layer which in a second flat region is opaque or has an optical density of 6 and there provides a metallic mirror, and if the Al layer is correspondingly etched, it is possible to achieve after the etching operation in the second region an opaque layer with properties which are still specularly reflecting and with an optical density of 2, while the Al layer has already been completely etched away in adjacent first regions which are provided with a relief structure with a high depth-to-width ratio.

Influencing factors when etching with lye are typically the composition of the etching bath, in particular the concentration of etching agent, the temperature of the etching bath and the afflux flow conditions of the layer to be etched in the etching bath. Typical parameter ranges in respect of the concentration of the etching agent in the etching bath are in the region of between 0.1% and 10% and in respect of temperature in the region of between 20° C. and 80° C.

The etching operation for the first layer can be electrochemically assisted. The etching operation is intensified by the application of an electrical voltage. The action is typically isotropic so that the structure-dependent increase in surface area additionally intensifies the etching effect. Typical electrochemical additives such as wetting agents, buffer substances, inhibitors, activators, catalysts and the like in order to remove for example oxide layers can promote the etching procedure.

During the etching procedure depletion of etching medium or enrichment in respect of the etching products can occur in the interface layer in relation to the first layer, whereby the etching speed is slowed down. Forced mixing of the etching medium, possibly by the production of a suitable flow or ultrasound excitation, improves the etching characteristics.

The etching procedure can further involve a temperature profile in respect of time in order to optimise the etching result. Thus etching can be effected in the cold condition at the beginning and warmer with an increasing period of operation. That is preferably implemented in the etching bath by a three-dimensional temperature gradient, in which case the multi-layer body is drawn through an elongate etching bath with different temperature zones.

The last nanometers of the first layer can prove to be relatively stubborn and resistant to etching in the etching procedure. Therefore, slight mechanical assistance for the etching process is advantageous for removing the remains of the last layer. The stubbornness is based on a possibly slightly different composition in respect of the first layer, presumably by virtue of interface layer phenomena when the first layer is formed on the replication layer. In that case the last nanometers of the first layer are preferably removed by a wiping process by the multi-layer body being passed over a roller covered with a fine cloth. The cloth wipes off the remains of the first layer without damaging the multi-layer body.

It will be appreciated that the process according to the invention can be readily combined with structuring or etching processes which are already known and which usually operate with masks in the form of structured etching resist masks or washing masks.

Besides wet-chemical etching processes use of dry etching processes such as plasma etching is also advantageous for partial complete or part-wise removal of the first layer.

In addition laser ablation has proved its worth for removing the first layer. A first layer which for example is in the form of a metallic reflection layer is in that case removed region-wise by direct irradiation with a suitable laser by making use of the absorption characteristics of the different relief structures in the different regions of the multi-layer body.

In the case of structures with a high depth-to-width ratio and in particular relief structures in which the typical spacing between two adjacent raised portions is less than the wavelength of the incident light, so-called zero order structures, a large part of the incident light can be absorbed, even if the degree of reflection of the reflection layer, in a region involving mirror reflection, is high. The reflection layer is irradiated by means of a focused laser beam, in which case the laser radiation is absorbed to an increased extent and the reflection layer is correspondingly increased in temperature in the strongly absorbent regions which have the above-mentioned structures with a high depth-to-width ratio. With high levels of energy input the reflection layer can locally spall off, in which case removal or ablation of the reflection layer or coagulation of the material of the reflection layer occurs. If energy input by the laser is effected only over a short period of time and the effect of thermal conduction is thus only slight, ablation or coagulation occurs only in the regions which are pre-defined by the relief structure.

Influencing factors in laser ablation are the configuration of the relief structure (period, depth, orientation, profile), the wavelength, polarisation and angle of incidence of the incident laser radiation, the duration of the action (time-dependent power) and the local dose of laser radiation, the properties and the absorption characteristics of the first layer, as well as the first layer possibly having further layers covering it above it or below it.

Inter alia Nd:YAG lasers have proven to be suitable for the laser treatment. They emit at about 1064 mm and are preferably also operated in a pulsed mode. It is further possible to use diode lasers. The wavelength of the laser radiation can be altered by means of a frequency change, for example frequency doubling.

The laser beam is guided over the multi-layer body by means of a so-called scanning device, for example by means of galvanometric mirrors and a focusing lens. Pulses of a duration in the region of nanoseconds to microseconds are emitted during the scanning operation and lead to the above-described ablation or coagulation of the first layer, as is predetermined by the structure. The pulse durations are typically below milliseconds, advantageously in the region of a few microseconds or less. It is thus certainly also possible to use pulse durations of nanoseconds to femtoseconds. Precise positioning of the laser beam is not necessary as the procedure is self-referencing. The procedure is preferably further optimised by a suitable choice in respect of the laser beam profile and overlapping of adjoining pulses.

It is however equally possible to control the path of the laser over the multi-layer body in register relationship with relief structures disposed in the replication layer so that only regions with the same relief structure are irradiated. For example camera systems can be used for such control.

Instead of a laser which is focused on to a point or a line it is also possible to use areal radiating devices which emit a short, controlled pulse such as for example flash lights.

The advantages of the laser ablation process include inter alia the fact that the partial removal of the first layer, in register relationship with a relief structure, can also take place if it is covered on both sides with one or more further layers which are transmissive in respect of the laser radiation, and it is thus not directly accessible to etching media. The first layer is only broken up by the laser. The material of the first layer breaks off again in the form of small conglomerates or small balls which are not optically visible to the viewing person and which only immaterially influence the transparency in the irradiated region.

Residues from the first layer which have still remained on the replication layer after the laser treatment can optionally be removed by means of a subsequent washing procedure if the first layer is directly accessible.

In accordance with a further preferred embodiment of the invention the first layer is applied to the replication layer in a surface density which is so selected that the transparency of the first layer in the first region is increased by the first relief structure with respect to the transparency of the first layer in the second region.

The opaque first layer which is produced with transparent regions in that way can also be altered by further process steps or used as a mask for producing further layers. For example it can be provided that the first layer is removed in the transparent regions. That can be implemented by an etching or ablation process as described hereinbefore. Thus for example in an intermediate step an etching mask is produced as a 1:1 copy from the first layer, covering the regions of the first layer, which are to be protected from the action of the etching agent.

The multi-layer body according to the invention can have further regions which are produced with conventional processes, for example to produce decorative color effects which extend over regions or over the entire multi-layer body.

The production of the first layer is not bound to a specific material. The first layer however should advantageously be opaque, outside transparent regions, if the time-controlled etching process described hereinbefore is not provided for setting a defined level of transmission.

Transparent materials can be colored in order to make them opaque. Preferably however it can be provided that the first layer is produced from a metal or a metal alloy. The opacity of the metallic layer can in that case be adjusted by the amount of material applied per unit of surface area, by the nature of the metal and by the relief structure in the first region.

Metallic first layers can be reinforced again by galvanisation for example in order to increase the reflection capability or the conductivity of the layer which has remained. It is possible in that way to produce connecting lines for electronic circuits or electronic components such as antennae and coils of high electrical quality.

It can be provided that the first metallic layer is reinforced by the application of the same metal. It can however also be provided that the first layer is produced from a first metal or a first metal alloy and a second metal is applied for reinforcement purposes. Thus by way of example it is possible to produce a layer which is built up layer-wise from different metals or metal alloys. That can involve for example a miniaturised bimetal element.

It can however also be provided that the first layer is built up layer-wise from partial layers of different metals or metal alloys in order to utilise the different physical and/or chemical properties of the partial layers for implementing the process steps and/or for producing the properties of the final product. By way of example the first layer can be built up from aluminum and chromium, in which case the aluminum which is a good reflector can improve the optical properties of the final product and the chromium which is chemically more resistant permits the etching procedures to be of an advantageous nature.

Layer-wise construction of the first layer is not restricted to metallic layers. This can also involve dielectric layers or polymer layers. In that respect it can also be provided that successive layers are made up from differing material and/or of differing thickness for example to produce the known color change effects on thin layers.

The polymer layer can be an organic semiconductor layer which can be a constituent part of an organic semiconductor component or an organic circuit. Such polymer layers can be produced in the form of fluids in the broadest sense and applied for example by means of printing processes. Because application of the polymer layer does not have to be effected in accurate register relationship in accordance with the process of the invention, it can be particularly inexpensively carried into effect.

It can be provided that the replication layer is in the form of a photoactive washing mask which is exposed through the first layer and activated and that the exposed regions of the washing mask and the regions of the first layer arranged there on the washing mask are removed.

Washing masks are distinguished by being environmentally friendly as for example it is also possible to use water as a solvent for removing the exposed regions of the washing mask. Care is to be taken to ensure however that the washing mask is sufficiently permanent in order not to limit the multi-layer body formed with the washing mask, in terms of its service life and/or reliability. It can be advantageous if removal of the exposed regions of the washing mask at the same time also entails removal of the surface structure produced there, with a high depth-to-width ratio. That can be advantageous in regard to introducing a second layer into the washed-out regions of the first layer.

As a further process it can be provided that a photosensitive layer is applied to the first layer. The thickness of the photosensitive layer can be in the region of between 0.05 μm and 50 μm, advantageously in the region of between 0.1 μm and 10 μm. That can involve a photoresist, as is known from the semiconductor industry. The photoresist can be a fluid which can be applied by means of a coating installation. Alternatively a dry thin photopolymer layer can also be applied by lamination.

The photoresist can be in the form of a positive photoresist or a negative photoresist. The positive photoresist is a photoresist in which exposed regions are soluble in a developer. In a corresponding fashion the negative photoresist is a photoresist in which unexposed regions are soluble in the developer. It is possible in that way to produce multi-layer bodies which are different, with a first layer.

By way of example when using a negative photoresist the first layer can be in the form of a metallic layer which is removed by etching in the unexposed regions and is then replaced by a second layer. For that purpose firstly the second layer is applied over the full surface area and then removed in the exposed regions together with the photoresist which has remained. The first layer can now be galvanically reinforced. In that way the partially transparent first layer can be converted into an opaque first layer which is embedded in a transparent surrounding area. In this case also association of the regions formed in that way, in accurate register relationship, is retained.

The choice of the appropriate photoresist can depend on the nature of the first layer used, the wavelength of the light source and the desired resolution. It can advantageously be provided that the light source emits UV light in the range of between 300 nm and 400 nm.

In regard to the choice of the light source, besides the spectral sensitivity of the photoresist, the transmission of the layers arranged over the photoresist, in particular that of the first layer, is also to be taken into consideration.

As regards now the development of the exposed photosensitive layer, an etching characteristic with an abrupt change can advantageously be provided when using a positive photoresist. The term etching characteristic is used to denote here the dependency of the etching rate, that is to say the removal of the exposed photosensitive layer per unit of time, on the energy density which acts on the photosensitive layer due to the exposure effect.

Subsequent to development of the photosensitive layer it can be used as an etching mask for the first layer. The first layer can consequently be removed by the action of the etching agent in the regions in which the photosensitive layer is removed by development.

In place of the photosensitive layer it is also possible to provide a photoactivatable layer. Such a layer can be altered by exposure in such a way that it forms an etching agent in the exposed regions and in that way can dissolve away the first layer.

It can also be provided that, in place of the photosensitive layer, an absorption layer is applied, which for example absorbs laser light and in that way is thermally destroyed in the regions irradiated with laser light. The absorption layer which is irradiated with laser light now forms the etching mask for removal of the regions of the first layer, which are transmissive for the laser light. The absorption layer however can also involve the first layer itself. By way of example, a relatively thick, suitably structured aluminum layer absorbs over 90% of the incident laser light, in which respect absorption can be wavelength-dependent. Structures which have only few diffraction orders for the incident laser light, that is to say in which for example the spacing between adjacent troughs is less than the wavelength of the incident laser light, are particularly suitable for laser ablation. It can be provided that a second layer is applied in the regions in which the first layer is removed. That can involve for example a colored layer or an electrochromic layer. Colored patterns or display elements can be produced in that fashion.

A preferred embodiment of the invention provides that the second layer can be applied over the full surface area involved subsequently to etching of the first layer. Thereupon the residues of the etching mask are removed, in which case the second layer is removed at the same time with the etching mask in those regions in which the etching mask covers the first layer. In that way the second layer is applied in accurate register relationship to the regions of the multi-layer body in which the first layer is removed.

Colored regions can also be produced in accordance with the process described hereinafter. A multi-layer body with a partial first layer of metal is produced by means of the process according to the invention, wherein the first layer in the first region is radiation-transmissive, for example for UV radiation, and serves as a mask for a colored photoresist layer applied to the first layer. Coloring of the photoresist layer can be effected in that case by means of pigments or soluble dyestuffs.

Then the photoresist is exposed through the first layer, by means for example of UV radiation, and hardened or destroyed in the first regions, depending on whether it is a positive or the negative resist. In that case positive and negative resist layers can also be applied in mutually juxtaposed relationship and exposed at the same time. In that case the first layer serves as a mask and is preferably arranged in direct contact with the photoresist so that precise exposure can be effected.

Finally, when developing the photoresist, the regions which have not been hardened are washed off or the destroyed regions are removed. Depending on the respective photoresist used the developed colored photoresist is now either present precisely in the regions in which the first layer is transparent or opaque in relation to the UV radiation. In order to increase the resistance of the photoresist layer which has remained and which is structured in accordance with the first layer, regions which have remained are preferably post-hardened after the development operation.

Finally the first layer which is used as the mask can be removed by a further etching step to such an extent that the multi-layer body only has a highly resolved 'color print' of photoresist for the viewing person, but is otherwise transparent.

Advantageously, display elements of high resolution can be produced in that way. Without departing from the scope of the invention it is possible for differently colored display elements to be applied in accurate register relationship and for them to be arranged for example in an image dot raster. As different multi-layer bodies can be produced with an initial layout in respect of the first layer, by a procedure whereby for example different exposure and etching processes are combined together or are carried out in succession, positioning in accurate register relationship of the successively applied layers is possible when using the process according to the invention, in spite of an increase in the process steps.

Rastering of the first layer is also possible to the effect that, beside raster elements which are underlaid with a reflection layer and which have possibly different diffractive diffraction structures, there are provided raster elements which represent transparent regions without a reflection layer. In that respect amplitude-modulated or area-modulated rastering can be selected as the rastering effect. Attractive optical effects can be achieved by a combination of such reflective/diffractive regions and non-reflective, transparent—under some circumstances also diffractive—regions. If such a raster image is arranged for example in a window in a value-bearing document, a transparent raster image can be perceived in the transillumination mode. In the incident illumination mode that raster image is visible only in a given angular range in which no light is diffracted/reflected by the reflecting surfaces. It is further possible for such elements to be used not only in a transparent window but also to be applied to a colored imprint. In a given angular range the colored imprint is visible for example in the form of the raster image while in another angular range it is not visible by virtue of the light which is reflected by the diffraction structures or other (macro-)structures. Furthermore it is also possible for a plurality of outgoing reflection regions which decrease in their reflectivity to be produced by a suitably selected rastering effect.

Because regions of stepped transparency can be produced by a variation in the depth-to-width ratio in the first layer, it can also be provided that the first layer is removed in subsequent steps, that is to say firstly the regions in which the first layer is at its thinnest are exposed and a second layer is applied there, thereafter the regions of the first layer which are of the next following thickness are removed and a third layer is applied there, and those steps are repeated until new layers are applied in all regions of the first layer with a high depth-to-width ratio. This can involve optically hardenable layers which are not subjected to initial dissolution after hardening by an etching agent.

In that way it is also possible for regions to be arranged in accurate register relationship in non-metallic layers. Thus for example the first layer can be formed from a dielectric with a first refractive index and the second layer can be formed from a dielectric with a second refractive index. In that way the second layer can form a pattern in the first layer or vice-versa. The pattern can be perceived in incident light by virtue of the differing light refraction of the two layers. Such a pattern is optically less striking than a pattern produced by metallic layers and can therefore be preferred as a security feature for passes or other security documents. It can appear to the viewing person for example as a transparent pattern of green or red.

Furthermore it is also possible to construct by means of the invention regions involving different metallic and non-metallic layers which respectively produce a differing thin film system with different optical properties, for example different viewing angle-dependent color shift effects. A thin film layer system is distinguished in principle by an interference layer structure which produces viewing angle-dependent color shifts. It can be made up in the form of a reflective element, with for example a highly reflecting metal layer, or a transmissive element with a transparency optical separation layer in relation to the individual layers. The basic structure of a thin film layer system has an absorption layer (preferably with between 30% and 65% transmission), a transparency spacer layer in the form of a color change-producing layer (for example $\lambda/4$ or $\lambda/2$ layer) and a metal layer as a reflecting layer or an optical separation layer. It is further possible for a thin film layer system to be made up from a succession of high-refraction and low-refraction layers. The greater the number of layers, the correspondingly easier is it possible to adjust the wavelength for the color change. Examples of usual layer thicknesses in respect of the individual layers of a thin film layer system and examples of materials which can be used in principle for the layers of a thin film layer system are disclosed by way of example in WO 01/03945, page 5, line 30 through page 8, line 5.

It can further be provided that the carrier layer is in the form of a replication layer.

The process according to the invention can be continued for application of further layers in accurate register relationship. By way of example a fourth layer can be applied to the layers arranged on the replication layer, in a surface density, that the transparency of the fourth layer in the first region is increased by the first relief structure with respect to the transparency of the fourth layer in the second region, and that the fourth layer is perforated in a manner determined by the first relief structure so that the fourth layer is perforated in the first region or in the second region but not in the second region or in the first region respectively. That fourth layer is thus in the form of a mask layer, like the first layer, so that the above-described process steps can be repeated in order to constitute the multi-layer body with further layers which are perforated in accurate register relationship. Transmission of the structured first layer can also be used for register-related structuring of the fourth layer. In that way it is possible for example to produce organic components and circuits, besides security elements.

It can also be provided that the succession of removal of material and the association with the structures in the first and second regions is so selected that regions are produced, in which different diffractive structures are interlaced with each other. This may involve for example a first optically variable security device (e.g. a first KINEGRAM®) and a second optically variable security device (e.g., a second KINEGRAM®) which have a different depth-to-width ratio and which are arranged in front of a background. In that example it can be provided that a vapor-deposited copper layer is removed only in the region of the first optically variable security device, then aluminum is applied by vapor deposition over the entire surface area and removed in the background regions by suitable process implementation. That produces two designs which are partially metallised in register relationship and which differ in the metal layer which faces towards the viewing person. In order to achieve such effects it is possible to use differences in the transmission properties of the above-mentioned regions, which are produced by polarization effects and/or wavelength dependencies and/or dependencies on the angle of incidence of the light.

The relief structures introduced into the replication layer can also be so selected that they can serve for orientation of liquid crystal (polymers). Thus in that case the replication layer and/or the first layer can be used as an orientation layer for liquid crystals. For example structures in groove form are introduced into such orientation layers, wherein the liquid crystals are oriented in relation to such structures before they are fixed in their orientation in that position by crosslinking or in some other fashion. It can be provided that the crosslinked liquid crystal layer forms the second layer.

The orientation layers can have regions in which the orientation direction of the structure constantly changes. If a region formed by means of such a diffractive structure is viewed through a polariser with for example a rotating direction of polarisation, various clearly discernible security features, for example motion effects, can thus be produced by virtue of the linearly changing direction of polarisation of the region. It can also be provided that the orientation layer has diffractive structures for orientation of the liquid crystals, which are locally differently oriented so that the liquid crystals when considered under polarised light represent an item of information such as for example a logo.

BRIEF DESCRIPTION OF THE DRAWINGS

The invention is described in greater detail with reference to the drawings in which.

DETAILED DESCRIPTION OF THE INVENTION

Figure 1:
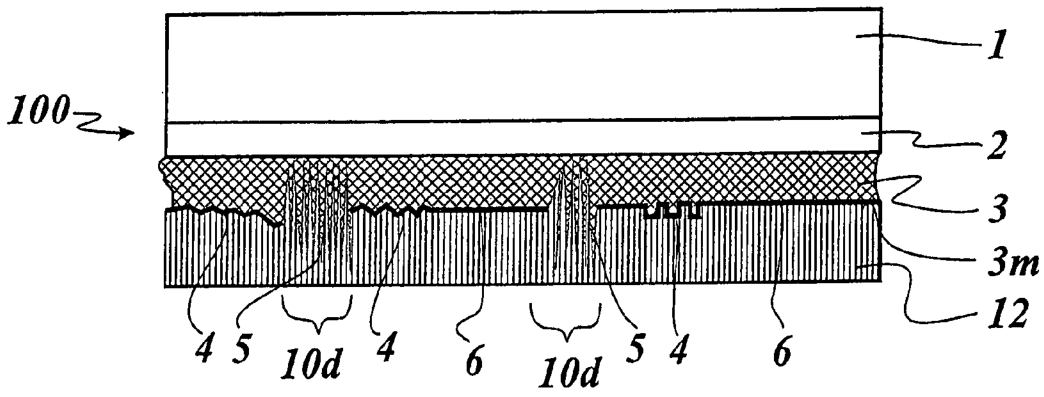
FIG. 1 shows a diagrammatic view in section of a first embodiment of a multi-layer body according to the invention.

FIG. 1 shows a multi-layer body 100 in which arranged on a carrier film 1 are a functional layer 2, a replication layer 3, a metallic layer 3*m* and an adhesive layer 12. The functional layer 2 is a layer which predominantly serves to enhance the mechanical and chemical stability of the multi-layer body but which can also be designed in known manner to produce optical effects. It can however also be provided that that layer is omitted and the replication layer 3 is disposed directly on the carrier film 1. It can further be provided that the carrier film 1 itself is in the form of a replication layer.

The multi-layer body 100 can be a portion of a transfer film, for example a hot stamping film, which is applied to a substrate by means of the adhesive layer 12. The adhesive layer 12 can be a melt adhesive which melts under the effect of heat and permanently joins the multi-layer body to the surface of the substrate.

The carrier film 1 can be in the form of a mechanically and thermally stable film comprising PET.

Regions involving different structures can be shaped into the replication layer 3 by means of known processes. In the illustrated embodiment these involve regions 4 having diffractive structures, that is to say with a comparatively low depth-to-width ratio of the structure elements, regions 5 with a high depth-to-width ratio of the structure elements, and reflecting regions 6.

The metallic layer 3*m* disposed on the replication layer 3 has demetallised regions 10*d* which are arranged in coincident relationship with the diffractive structures 5. The multi-layer body 100 appears transparent or partially transparent in the regions 10*d*.

FIGS. 2 through 8 now show the production stages of the multi-layer body 100. The same components as in FIG. 1 are denoted by the same references.

Figure 2:
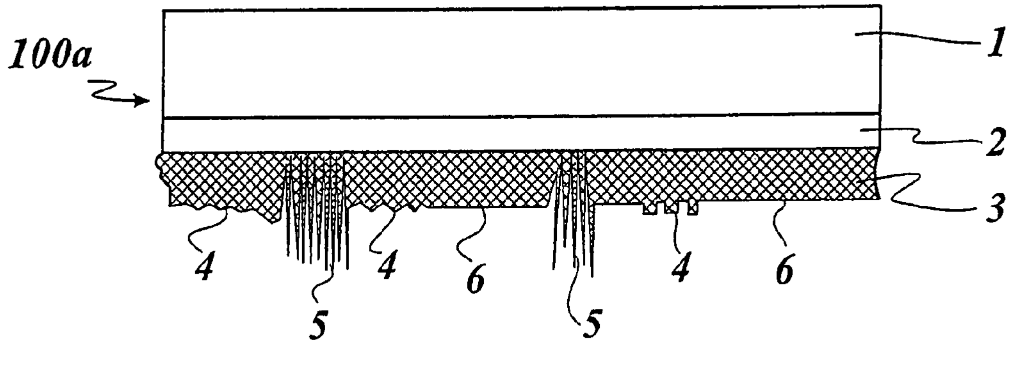
FIG. 2 shows a diagrammatic view in section of the first production stage of the multi-layer body of FIG. 1.

FIG. 2 shows a multi-layer body 100*a* in which the functional layer 2 and the replication layer 3 are arranged on the carrier film 1.

The replication layer 3 is structured in its surface by known processes such as for example hot stamping. The replication layer 3 can be a UV hardenable replication lacquer which is structured for example by a replication roller. The structuring however can also be produced by UV radiation through an exposure mask. In that way the regions 4, 5 and 6 can be shaped into the replication layer 3. The region 4 can be for example the optically active regions of a hologram or an optically variable security device, known in the art by the trademark KINEGRAM®.

Figure 3A:
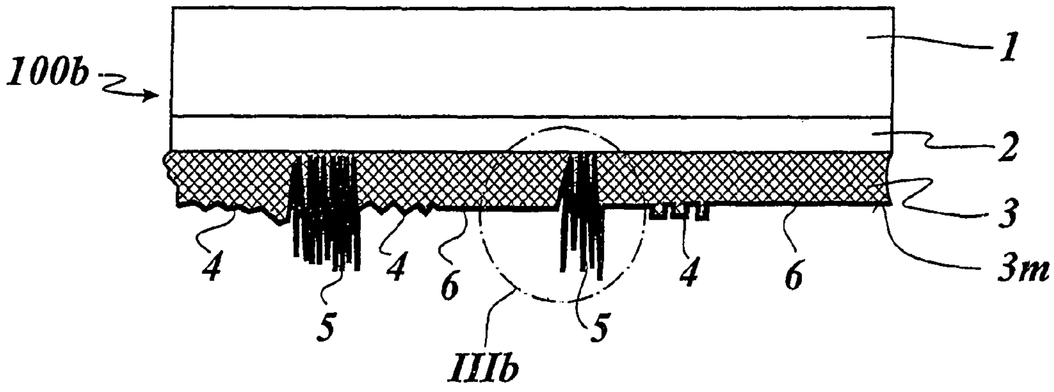
FIG. 3*a* shows a diagrammatic view in section of the second production stage of the multi-layer body of FIG. 1.

FIG. 3*a* now shows a multi-layer body 100*b* which is formed from the multi-layer body 100*a* in FIG. 2, by a procedure whereby the metallic layer 3*m* is applied to the replication layer 3 with a uniform surface density, for example by sputtering. In this embodiment the metallic layer 3*m* involves a layer thickness of some 10 nm. The layer thickness of the metallic layer 3*m* can preferably be so selected that the regions 4 and 6 involve a low level of transmission, for example between 10% and 0.001%, that is to say an optical density of between 1 and 5, preferably between 1.5 and 3. Accordingly the optical density of the metallic layer 3*m*, that is to say the negative decadic logarithm of transmission, is between 1 and 3 in the regions 4 and 6. It can preferably be provided that the metallic layer 3*m* involves an optical density of between 1.5 and 2.5. The regions 4 and 6 therefore appear to be opaque or reflecting to the eye of the person viewing them.

The metallic layer 3*m* in contrast is of reduced optical density in the region 5. The responsibility for that lies with the increase in surface area in that region because of the high depth-to-width ratio of the structure elements and the thickness which is reduced thereby of the metallic layer. The dimension-less depth-to-width ratio is a characterising features for the increase in surface area of preferably periodic structures. Such a structure forms 'peaks' and 'troughs' in a periodic succession. The spacing between a 'peak' and a 'trough' is referred to here as the depth while the spacing between two 'peaks' is referred to as the width. Now, the higher the depth-to-width ratio, the correspondingly steeper are the 'peak flanks' and the correspondingly thinner is the metallic layer 3*m* deposited on the 'peak flanks'. That effect is also to be observed when the situation involves discretely distributed 'troughs' which can be arranged relative to each other at a spacing which is a multiple greater than the depth of the 'troughs'. In such a case the depth of the 'trough' is to be related to the width of the 'trough' in order to correctly describe the geometry of the 'trough' by specifying the depth-to-width ratio.

Figure 3B:
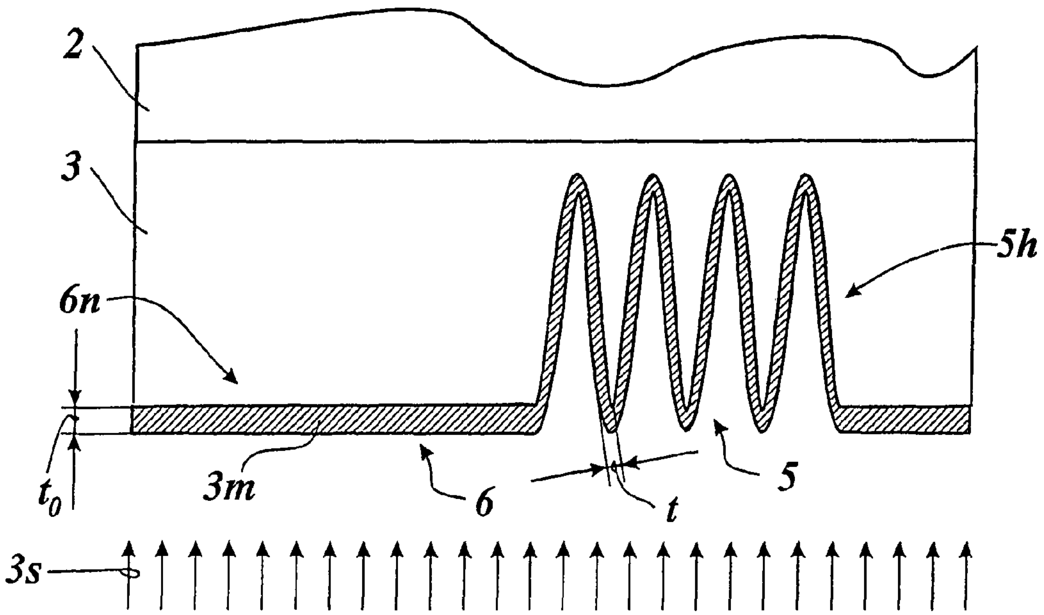
FIG. 3*b* shows a view on an enlarged scale of a portion IIIb from FIG. 3*a*.

FIG. 3*b* now shows in detail the thickness change effect in respect of the metal layer 3*m*, which is responsible for affording transparency.

FIG. 3*b* is a diagrammatic view in section of an enlarged portion IIIb from FIG. 3*a*. The replication layer 3 has a relief structure 5*h* with a high depth-to-width ratio in the region 5 and a relief structure 6*n* with a depth-to-width ratio of equal to zero in the region 6. Arrows 3*s* identify the direction of application of the metal layer 3*m* which can be applied by sputtering, as described hereinbefore. The metal layer 3*m* is formed with the nominal thickness $t_0$ in the region of the relief structure 6*n* and with the thickness t which is less than the nominal thickness $t_0$, in the region of the relief structure 5*h*. In that respect the thickness t is to be interpreted as a mean value for the thickness t is in dependence on the angle of inclination of the surface of the relief structure 5*h* with respect to the horizontal. That angle of inclination can be described mathematically by the first derivative of the function of the relief structure 5*t*.

If therefore the angle of inclination is equal to zero, the metal layer 3_m_ is deposited with the nominal thickness $t_0$, while if the magnitude of the angle of inclination is greater than zero, the metal layer 3_m_ is deposited with the thickness t, that is to say with a smaller thickness than the nominal thickness $t_0$.

It is also possible to achieve transparency for the metal layer by relief structures which have a complex surface profile with raised portions and recesses of differing height. Surface profiles of that kind can also involve stochastic surface profiles. In that case, transparency is generally attained if the mean spacing of adjacent structure elements is less than the mean profile depth of the relief structure and adjacent structure elements are spaced from each other at less than 200 μm. Preferably in that respect the mean spacing of adjacent raised portions is selected to be less than 30 pin so that the relief structure 5_h_ is a specific diffractive relief structure.

In terms of the configuration of transparent regions it is important for the individual parameters to be known in terms of their dependencies and appropriately selected. A viewing person already perceives a region as being fully reflecting if 85% of the incident light is reflected, and already perceives a region as being transparent if less than 20% of the incident light is reflected, that is to say more than 80% is transmitted. Those values can vary in dependence on the background, illumination and so forth. In that respect an important part is played by the absorption of light in the metal layer. By way of example chromium and copper reflect much less under some circumstances. That can signify that only 50% of the incident light is reflected, in which case the degree of transparency is less than 1%.

Table 1 shows the ascertained degree of reflection of metal layers of Ag, Al, Au, Cr, Cu, Rh and Ti, arranged between plastic films (refractive index n=1.5) at a light wavelength λ=550 nm. In this case the thickness ratio ∈ is formed as the quotient of the thickness t of the metal layer, which is required for the degree of reflection R=80% of the maximum $R_{Max}$ and the thickness required for the degree of reflection R=20% of the maximum $R_{Max}$.

TABLE 1

| Metal | $R_{Max}$ | t for 80% $R_{Max}$ | t for 20% $R_{Max}$ | ϵ | h/d |
|---|---|---|---|---|---|
| Ag | 0.944 | 31 nm | 9 nm | 3.4 | 1.92 |
| Al | 0.886 | 12 nm | 2.5 nm | 4.8 | 2.82 |
| Au | 0.808 | 40 nm | 12 nm | 3.3 | 1.86 |
| Rh | 0.685 | 18 nm | 4.5 nm | 4.0 | 2.31 |
| Cu | 0.557 | 40 nm | 12 nm | 3.3 | 1.86 |
| Cr | 0.420 | 18 nm | 5 nm | 3.6 | 2.05 |
| Ti | 0.386 | 29 nm | 8.5 nm | 3.3 | 1.86 |

From the point of view of heuristic consideration silver and gold (Ag and Au), as can be seen, have a high maximum degree of reflection $R_{Max}$ and require a relatively small depth-to-width ratio to produce transparency. Aluminum (Al) admittedly also has a high maximum degree of reflection $R_{Max}$, but it requires a higher depth-to-width ratio. It can preferably therefore be provided that the metal layer is formed from silver or gold. It can however also be provided that the metal layer is formed from other metals or from metal alloys.

Table 2 now shows the calculation results obtained from strict diffraction calculations for relief structures with different depth-to-width ratios, which are in the form of linear, sinusoidal gratings with a grating spacing of 350 nm. The relief structures are coated with silver of a nominal thickness $t_0$=40 nm. The light which impinges on the relief structures is of the wavelength λ=550 nm (green) and is TE-polarised or TM-polarised.

TABLE 2

| Depth-to-width ratio | Grating spacing in nm | Depth in nm | Degree of reflection (0R) TE | Degree of transparency (0T) TE | Degree of reflection (0R) TM | Degree of transparency (0T) TM |
|---|---|---|---|---|---|---|
| 0 | 350 | 0 | 84.5% | 9.4% | 84.5% | 9.4% |
| 0.3 | 350 | 100 | 78.4% | 11.1% | 50.0% | 21.0% |
| 0.4 | 350 | 150 | 42.0% | 45.0% | 31.0% | 47.0% |
| 1.1 | 350 | 400 | 2.3% | 82.3% | 1.6% | 62.8% |
| 2.3 | 350 | 800 | 1.2% | 88.0% | 0.2% | 77.0% |

As was found, in particular the degree of transparency apart from the depth-to-width ratio is dependent on the polarisation of the radiated light. That dependency is shown in Table 2 for the depth-to-width ratio d/h=1.1. It can be provided that that effect is put to use for the selective formation of further layers.

It was further found that the degree of transparency or the degree of reflection of the metal layer 3_m_ with the relief structure 5_t_ (see FIG. 3_b_) is wavelength-dependent. That effect is particularly highly pronounced for TE-polarised light.

It was further found that the degree of transparency decreases if the angle of incidence of the light differs from the normal angle of incidence, that is to say the degree of transparency decreases if the light is not perpendicularly incident. That signifies that the metal layer 3_m_ can be transparent than in the region of the relief structure 5_t_, only in a restricted cone of incidence of the light. It can therefore be provided that the metal layer 3_m_ is opaque when viewed inclinedly, in which respect that effect can also be used for the selective formation of further layers.

Figure 4:
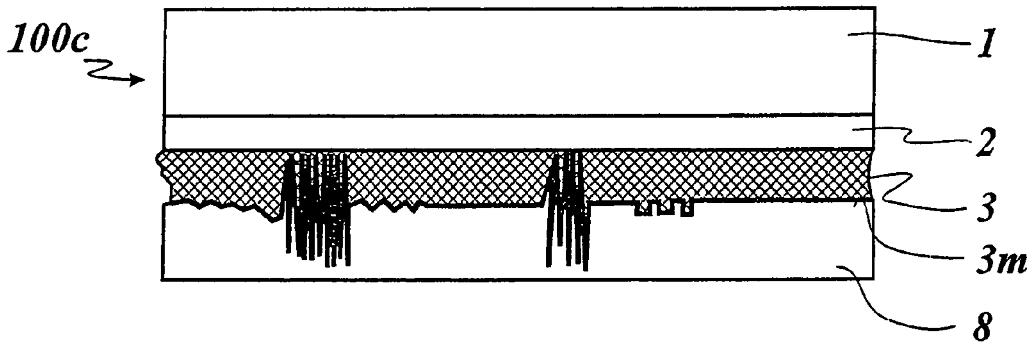
FIG. 4 shows a diagrammatic view in section of the third production stage of the multi-layer body of FIG. 1.

FIG. 4 shows a multi-layer body 100_c_ formed from the multi-layer body 100_b_ shown in FIG. 3_a_ and a photosensitive layer 8. This can be an organic layer which is applied by conventional coating processes such as intaglio printing in fluid form. It can also be provided that the photosensitive layer is applied by vapor deposition or is applied by lamination in the form of a dry film.

The application can be over the entire surface area. It is however also possible to provide for application in partial regions, for example in regions arranged outside the above-mentioned regions 4 through 6. This can involve regions which have to be arranged only relatively coarsely in register relationship with the design, for example decorative graphic representations such as for example random patterns or patterns formed from repeated images or texts.

Figure 5:
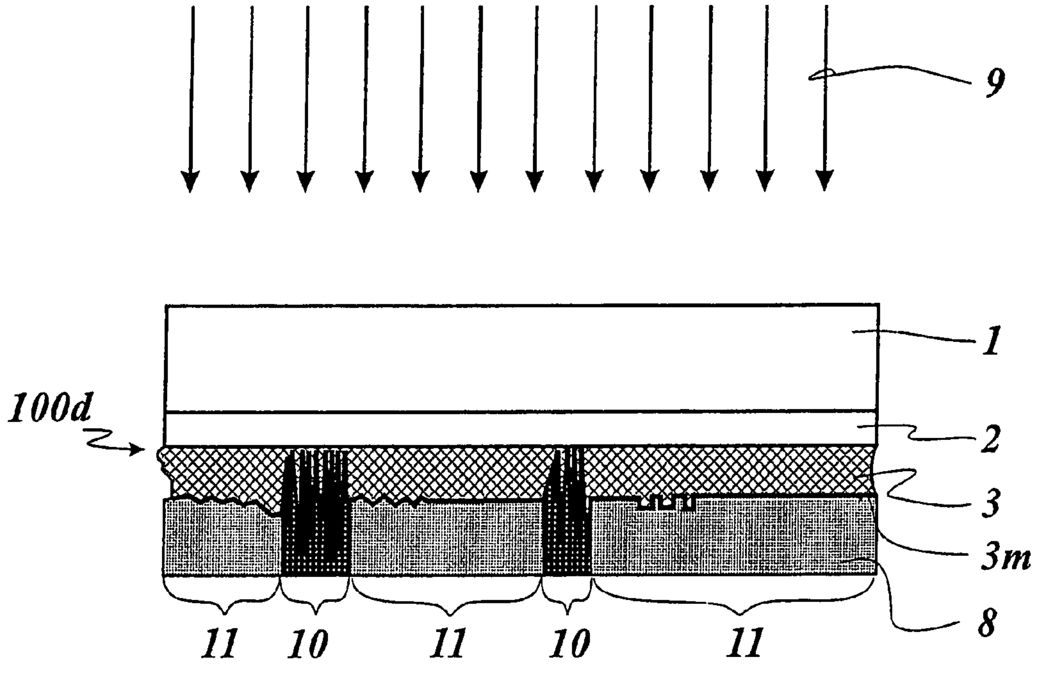
FIG. 5 shows a diagrammatic view in section of the fourth production stage of the multi-layer body of FIG. 1.

FIG. 5 now shows a multi-layer body 100_d_ which is formed by exposure of the multi-layer body 100_c_ in FIG. 4 through the carrier film 1. UV light 9 can be provided for the exposure operation. Because now, as described hereinbefore, the regions 5 with a high depth-to-width ratio are transparent the UV irradiation operation produces in the photosensitive layer 8 regions 10 which have been greatly exposed and which differ from less exposed regions 11, in terms of their chemical properties. The regions 10 and 11 can differ for example by the solubility of the photosensitive layer arranged there in solvents. In that way the photosensitive layer 8 can be "developed" after the exposure operation with UV light, as is further shown in FIG. 6.

Although a depth-to-width ratio of >0.3 is advantageously provided in the regions 5 and the thickness of the metallic layer 3*m* is advantageously so selected that the regions 5 are at least partially transparent, the process according to the invention can always be used if a difference in optical density, which is sufficient for processing of the photosensitive layer, is provided between the regions with a high depth-to-width ratio and the other regions. There is therefore no need for the metallic layer 3*m* to be so thin that the regions 5 appear transparent when considered visually. A relatively low overall transmission of the vapor-deposited carrier film can be compensated by an increased exposure dose in respect of the photosensitive layer 8. It is further to be borne in mind that exposure of the photosensitive layer is typically provided in the near UV range so that the visual viewing impression is not crucial in terms of assessing transmission.

Figure 5A:
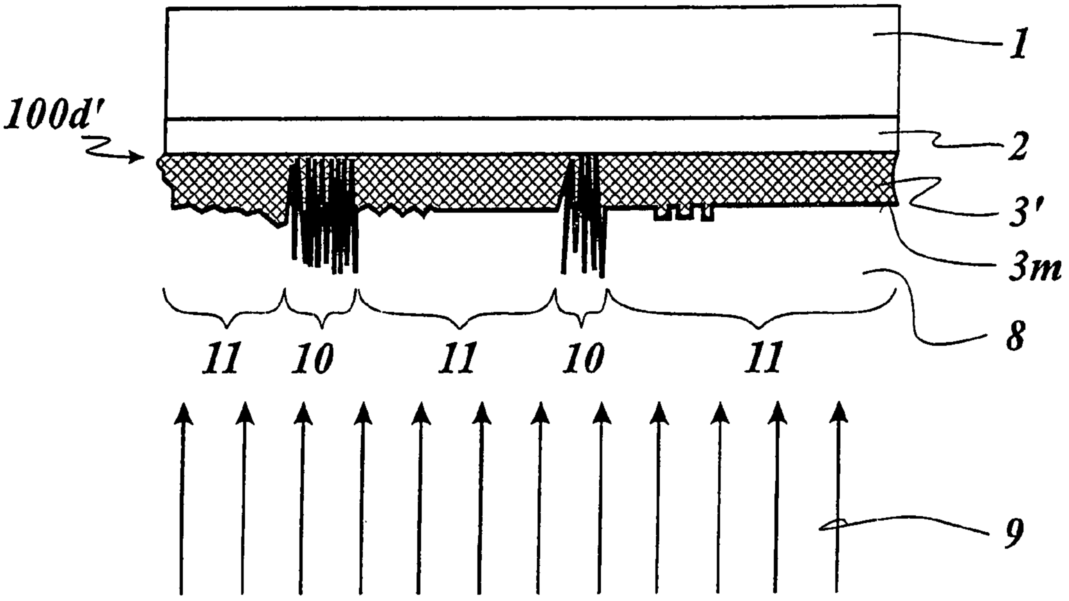
FIG. 5*a* shows a diagrammatic view in section of a modified configuration of the production stage shown in FIG. 5.
Figure 5B:
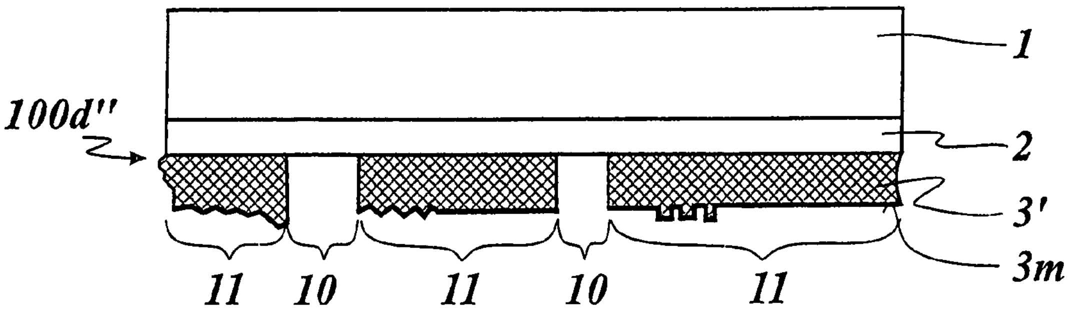
FIG. 5*b* shows a diagrammatic sectional view of the production stage following that shown in FIG. 5*a*.

FIGS. 5*a* and 5*b* show a modified embodiment. The photosensitive layer 8 shown in FIG. 5 is not provided in the multi-layer body 100*d*' in FIG. 5*a*. Instead there is a replication layer 3' which is a photosensitive washing mask. The multi-layer body 100*d*' is exposed from below, whereby, in the greatly exposed regions 10, the replication layer 3' is changed in such a way that it can be washed off.

FIG. 5*b* now shows a multi-layer body 100*d*'' which functionally corresponds to the multi-layer body shown hereinafter in FIG. 8. It will be noted however that not just the metallic layer 3*m* is removed in the regions 10, but also the also the replication layer 3'. That provides that the transparency is improved in those regions, in relation to the multi-layer body shown in FIG. 8, and fewer production steps are required.

Figure 6:
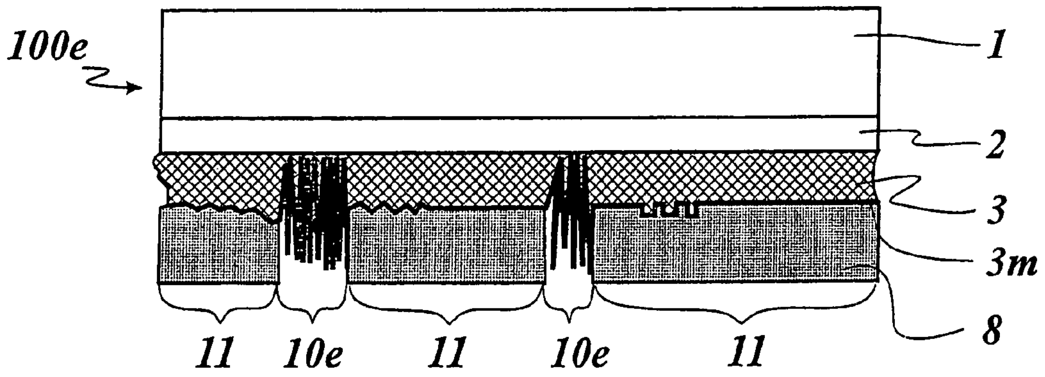
FIG. 6 shows a diagrammatic view in section of the fifth production stage of the multi-layer body of FIG. 1.

FIG. 6 shows the multi-layer body 100*e* which is formed from the multi-layer body 100*d* by the action of a solvent applied to the surface of the exposed photosensitive layer 8. That now produces regions 10*e* in which the photosensitive layer 8 is removed. The regions 10*e* are the regions 5 described with reference to FIG. 3, with a high depth-to-width ratio of the structure elements. The photosensitive layer 8 is retained in regions 11 because they involve the regions 4 and 6 which are described with reference to FIG. 3*a* and which do not have the high depth-to-width ratio.

In the embodiment shown in FIG. 6 the photosensitive layer 8 is formed from a positive photoresist. When using such a photoresist the exposed regions are soluble in the developer. In contrast thereto when using a negative photoresist the unexposed regions are soluble in the developer, as is described hereinafter in the embodiment shown in FIGS. 9 through 12.

Figure 7:
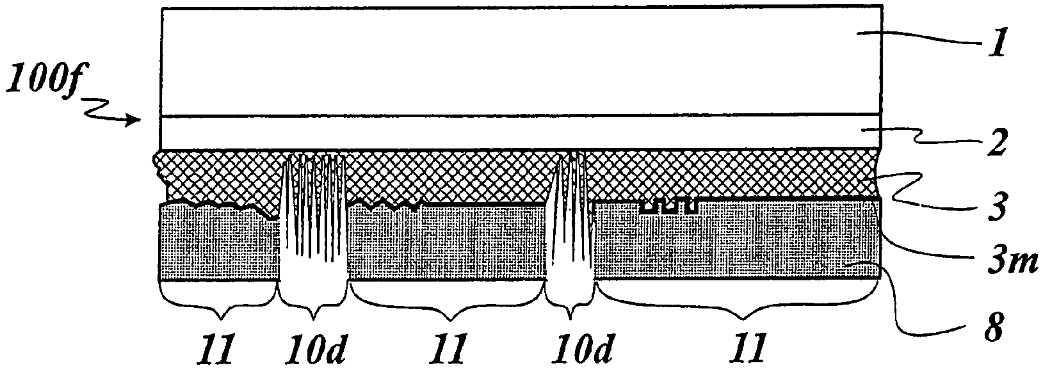
FIG. 7 shows a diagrammatic view in section of the sixth production stage of the multi-layer body of FIG. 1.

Now, as shown by reference to a multi-layer body 100*f* in FIG. 7, the metallic layer 3*m* can be removed in the regions 10*e* which are not protected from the attack of the etching agent by the developed photosensitive layer serving as the etching mask. The etching agent can be for example an acid or a lye. The demetallised regions 10*d* also shown in FIG. 1 are produced in that fashion.

In that way therefore the metallic layer 3*m* can be demetallised in accurate register relationship without involving additional technological complication. No complicated and expensive precautions have to be taken for that purpose, such as for example when applying an etching mask by mask exposure or pressure. When such a conventional process is involved tolerances of >0.2 mm are usual. In contrast, with the process according to the invention tolerances in the μm range into the nm range are possible, that is to say tolerances which are governed only by the replication process selected for structuring of the replication layer and the origination, that is to say the production of the stamping punch die.

It can be provided that the metallic layer 3*m* is in the form of a succession of different metals and the differences in the physical and/or chemical properties of the metallic partial layers are put to use. It can be provided for example that aluminum is deposited as the first metallic partial layer, having a high level of reflection and therefore causing reflecting regions to be clearly evident when the multi-layer body is viewed from the carrier side. The second metallic partial layer deposited can be chromium which has a high level of chemical resistance to various etching agents. The etching operation for the metallic layer 3*m* can now be implemented in two stages. It can be provided that the chromium layer is etched in the first stage, in which case the developed photosensitive layer 8 is provided as the etching mask, and then in the second stage the aluminum layer is etched, in which case the chromium layer now acts as the etching mask. Such multi-layer systems permit a greater degree of flexibility in the choice of the materials used in the production procedure for the photoresist, the etching agent for the photoresist and the metallic layer.

Figure 8:
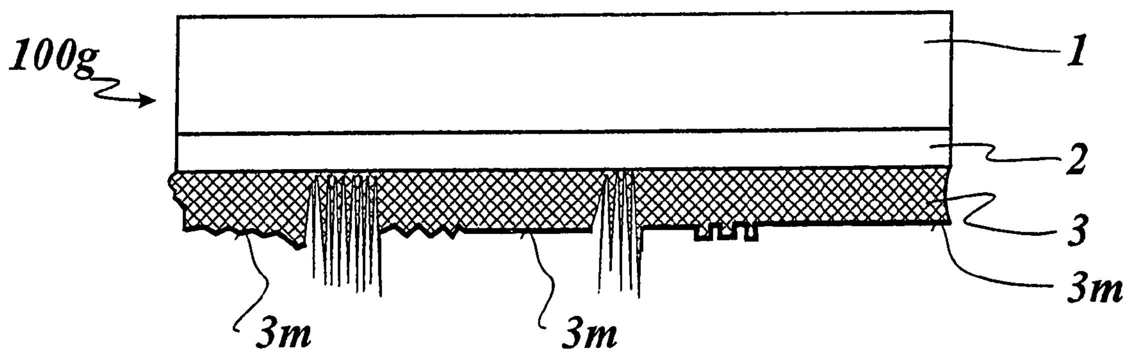
FIG. 8 shows a diagrammatic view in section of the seventh production stage of the multi-layer body of FIG. 1.

FIG. 8 shows the optional possibility of removing the photosensitive layer after the production step shown in FIG. 7. FIG. 8 illustrates a multi-layer body 100*g* formed from the carrier film 1, the functional layer 2, the replication layer 3 and the structured metallic layer 3*m*.

The multi-layer body 100*g* can be converted into the multi-layer body 100 shown in FIG. 1 by subsequently applying the adhesive layer 12.

Figure 9:
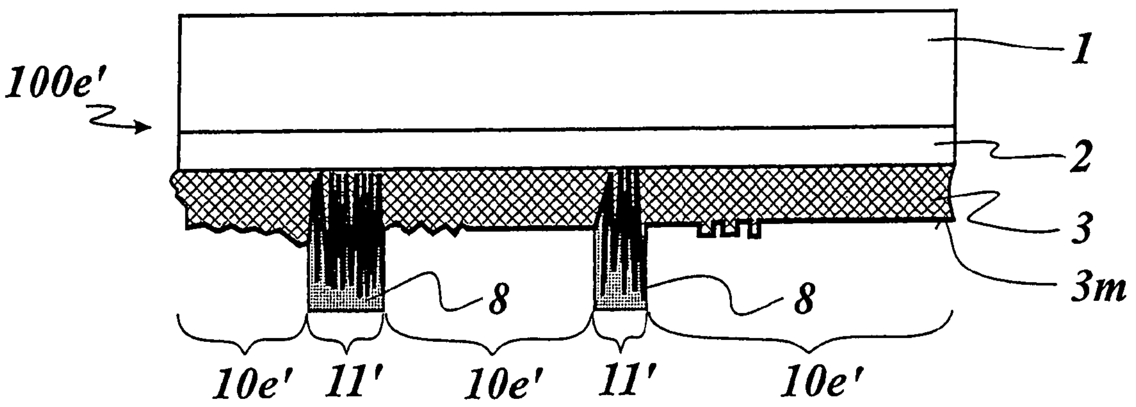
FIG. 9 shows a diagrammatic view in section of the fifth production stage of a second embodiment of the multi-layer body of FIG. 1.

FIG. 9 now shows a second embodiment of a multi-layer body 100*e* in which the photosensitive layer 8 is formed from a negative photoresist. As can be seen from FIG. 9 a multi-layer body 100*e*' has regions 100*e*' in which the exposed photosensitive layer 8 is removed by development. The regions 100*e*' involve opaque regions of the metallic layer 3*m* (see references 4 and 6 in FIG. 3*a*). The exposed photosensitive layer 8 is not removed in regions 11, that involves transparent regions of the metallic layer 3*m* (see reference 5 in FIG. 3*a*).

Figure 10:
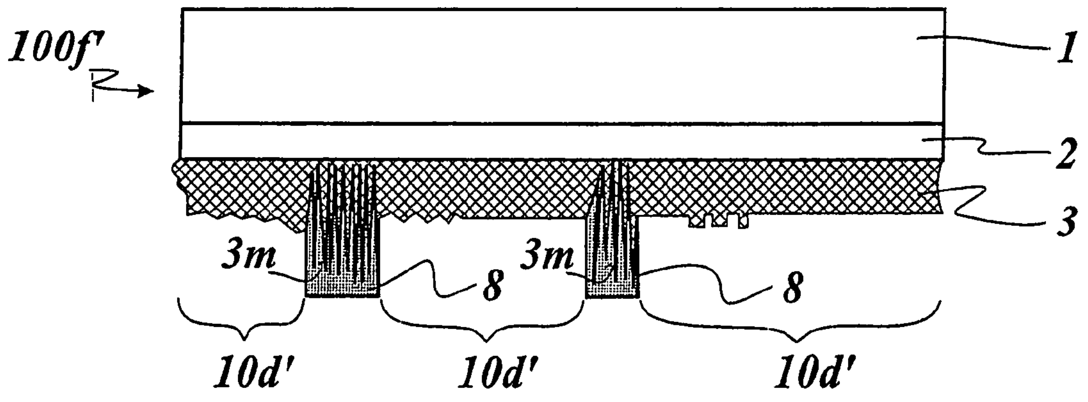
FIG. 10 shows a diagrammatic view in section of the sixth production stage of a second embodiment of the multi-layer body of FIG. 1.

FIG. 10 shows a multi-layer body 100*f*' formed by removal of the metallic layer 3*m* by an etching process from the multi-layer body 100*e*' (FIG. 9). For that purpose the developed photosensitive layer 8 is provided as the etching mask which is removed in the regions 100*e*' (FIG. 9) so that the etching agent there breaks down the metallic layer 3*m*. That results in the formation of regions 10*d*' which no longer have a metallic layer 3*m*.

Figure 11:
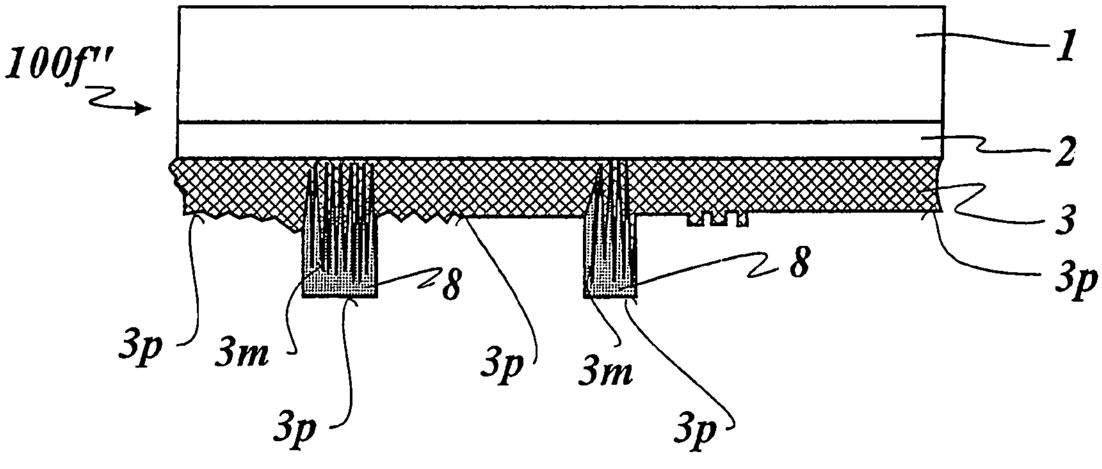
FIG. 11 shows a diagrammatic view in section of the seventh production stage of a second embodiment of the multi-layer body of FIG. 1.

As shown in FIG. 11 a multi-layer body 100*f*'' is now formed from the multi-layer body 100*f*', having a second layer 3*p* which covers the exposed replication layer 3 in the regions 10*d*'. The layer 3*p* can be a dielectric such as $TiO_2$ or ZnS, or a polymer. Such a layer can be for example vapor-deposited over a surface, in which respect it can be provided that the layer is formed from a plurality of mutually superposed thin layers which can differ for example in their refractive index and which in that way can produce color effects in the light shining thereon. A thin layer having color effects can be formed for example from three thin layers with a high-low-high-index configuration. The color effect appears less striking in comparison with metallic reflecting layers, which is advantageous for example if patterns are to be produced on passports or identity cards in that way. The patterns can appear to the viewing person for example as transparent green or red.

Polymer layers can be for example in the form of organic semiconductor layers. In that way an organic semiconductor component can be formed by a combination with further layers.

Figure 12:
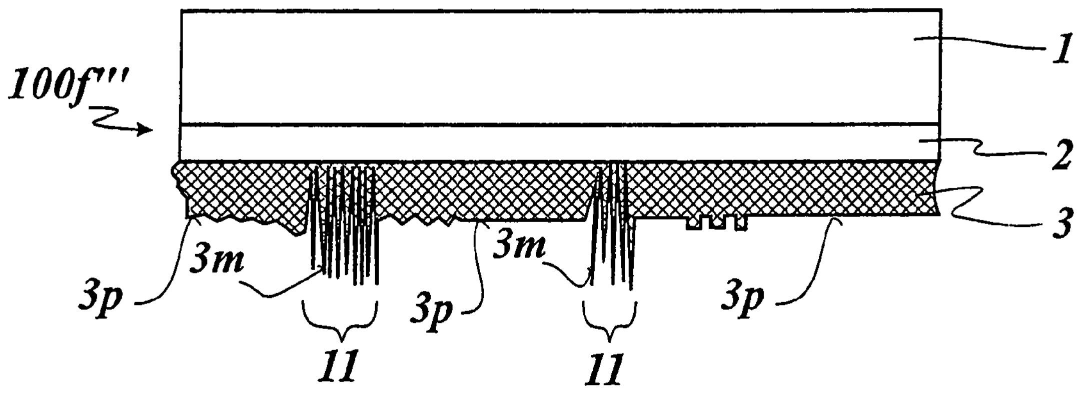
FIG. 12 shows a diagrammatic view in section of the eighth production stage of a second embodiment of the multi-layer body of FIG. 1.

FIG. 12 now shows a multi-layer body **100*f*''' formed from the multi-layer body 100*f*'' (FIG. 11) after removal of the remaining photosensitive layer. That can involve the well-known 'lift-off' procedure. In that way the second layer 3*p* applied in the previous step is there removed again at the same time. Therefore, adjacent regions with layers 3*p* and 3*m* are now formed on the multi-layer body 100*f*''', which can differ from each other for example in their optical refractive index and/or their electrical conductivity. It will be noted however that the regions 11 provided with the metallic layer 3*m* appear partially transparent because of the high depth-to-width ratio of the structure elements. The metallic layer region 3*m* can then also be chemically removed if the chemical properties of the layers 3*m* and 3*p*** suitably differ from each other.

It can now be provided that the metallic layer **3*m* is galvanically reinforced and in that way the regions 11** are for example in the form of opaque metallically coated regions.

It can also be provided that the transparency of the regions 11 further increased and for that purpose the metallic layer **3*m* is removed by etching. It is possible to provide an etching agent which does not attack the layer 3*p*** applied in the other regions. It can however also be provided that the etching agent is caused to act only until the metallic layer is removed.

It can further be provided that there is then applied to the multi-layer body **100*f*''' (FIG. 12) a third layer which can be formed from a dielectric or a polymer. That can be done with the process steps described hereinbefore, by a procedure whereby once again a photosensitive layer is applied, which after exposure and development covers the multi-layer body 100*f*''' outside the regions 11**. The third layer can now be applied as described hereinbefore and then the remains of the photosensitive layer are removed and thus at the same time the third layer is removed in those regions. In that way for example layers of organic semiconductor components can be structured in a particularly fine fashion and in accurate register relationship.

Figure 13:
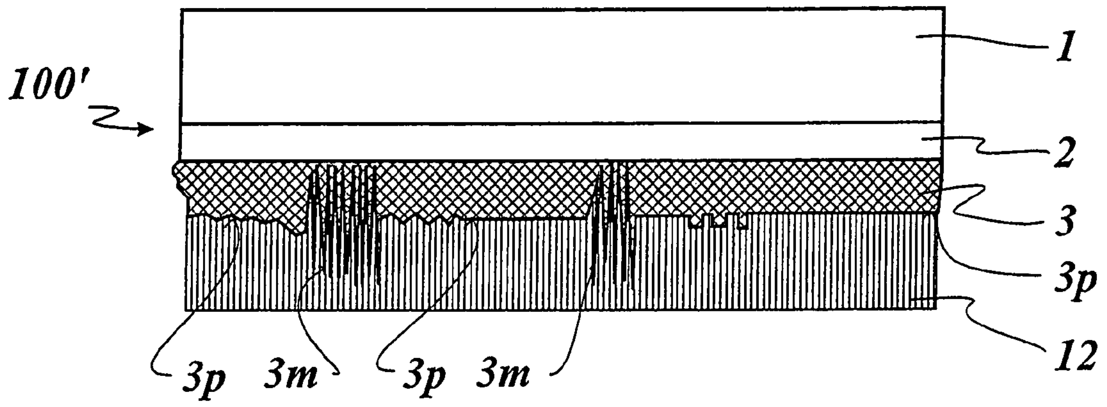
FIG. 13 shows a diagrammatic view in section of a second embodiment of a multi-layer body according to the invention.

FIG. 13 now shows a multi-layer body 100' which is formed from the multi-layer body **100*f*''' (FIG. 12) by the addition of the adhesive layer 12 shown in FIG. 1. The multi-layer body 100' has been produced, like the multi-layer body 100 shown in FIG. 1, by using the same replication layer 3**. It is therefore possible with the process according to the invention to produce multi-layer bodies of differing configurations, starting from one layout.

The process according to the invention can be further developed without adverse effects in terms of quality in order to structure further layers in accurate register relationship. For that purpose it can be provided that further optical effects such as total reflection, polarisation and spectral transparency of the previously applied layers are used to form regions of differing transparency in order to produce exposure masks involving accurate register relationship.

It can also be provided that different local absorption capability is afforded by mutually superposed layers and exposure or etching masks are produced by laser-supported thermal ablation.

FIGS. **14*a* through 14*d* now show by reference to an embodiment by way of example how the metallic layer 3*m* arranged in the regions 11 can be removed in accurate register relationship from the multi-layer body 100*f*''' shown in FIG. 12 and can be replaced in accurate register relationship by a non-metallic layer 3*p*'. The layer 3*p*' can be a dielectric layer which differs in its optical refractive index from the layer 3*p***.

FIG. **14*a* shows a multi-layer body 100*g* in which the metallic layer 3*m* is galvanically reinforced so that it is opaque. The layer 3*m* is a metallic layer which is arranged in a region of the replication layer 3** with a high depth-to-width ratio and which therefore prior to the galvanic reinforcement operation was in the form of a partially transparent metallic layer.

A photosensitive layer 8 covers over the regions **3*p* and 3*m* disposed on the replication layer 3 (see also FIG. 12**).

FIG. **14*b* now shows a multi-layer body 100*g*' obtained by exposure and development of the photosensitive layer 8, as described hereinbefore with reference to FIGS. 5 and 6. The regions 11 covered with the developed photosensitive layer form an etching mask so that the metallic layer 3*m* can be removed by etching in the regions 10*e*** in which the photosensitive layer is removed after the development operation.

FIG. **14*c* shows after a further process step a multi-layer body 100*g*'' on which a layer 3*p*' which can be in the form of a dielectric is applied over the full surface area involved. The layer 3*p*' can also be in the form of a thin-layer system comprising a plurality of successively applied layers, whereby the layer 3*p*' can produce color change effects in known manner. It is to be borne in mind however that the layer 3*p*'** can be more or less transparent in regions with a high depth-to-width ratio so that the color change effect is to be observed to a greater or lesser extent.

FIG. **14*d* now shows a multi-layer body 100*g*''' after removal of the remains of the photosensitive layer 8 and the regions arranged thereon of the layer 3*p*'; the multi-layer body 100*g*''' can be made into a complete multi-layer body for example by the addition of an adhesive layer as described hereinbefore with reference to FIG. 13**.

On the replication layer 3 the multi-layer body **100*g*''' has regions which are covered with the layer 3*p* and regions which are covered with the layer 3*p*'**.

Figure 14A:
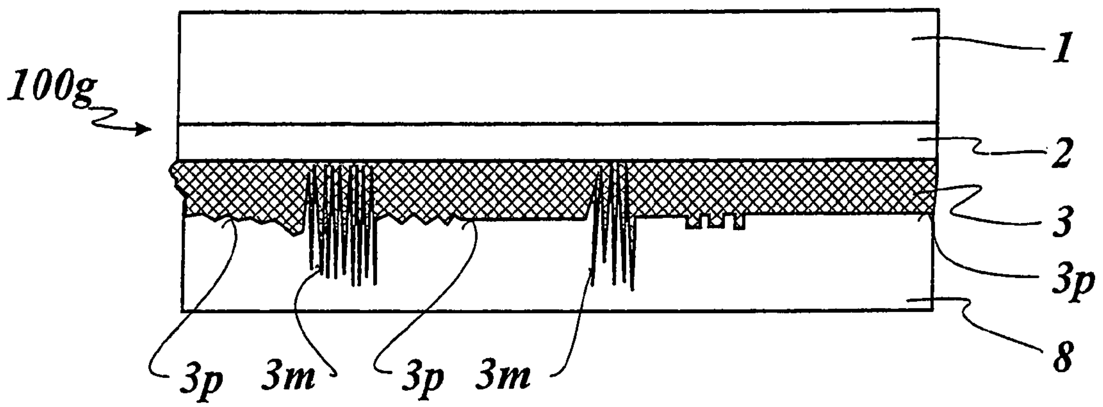
FIGS. 14*a* through 14*d* show diagrammatic views in section of the production steps of a third embodiment of a multi-layer body according to the invention.
Figure 14B:
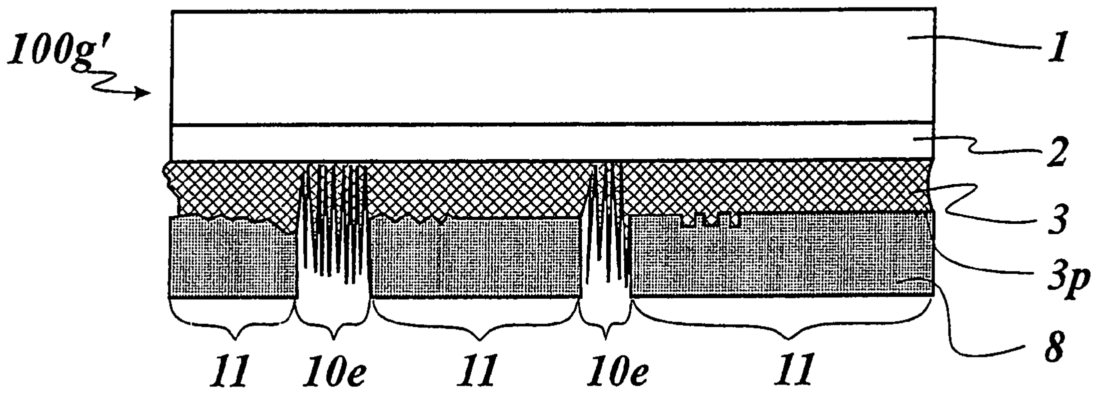
Figure 14C:
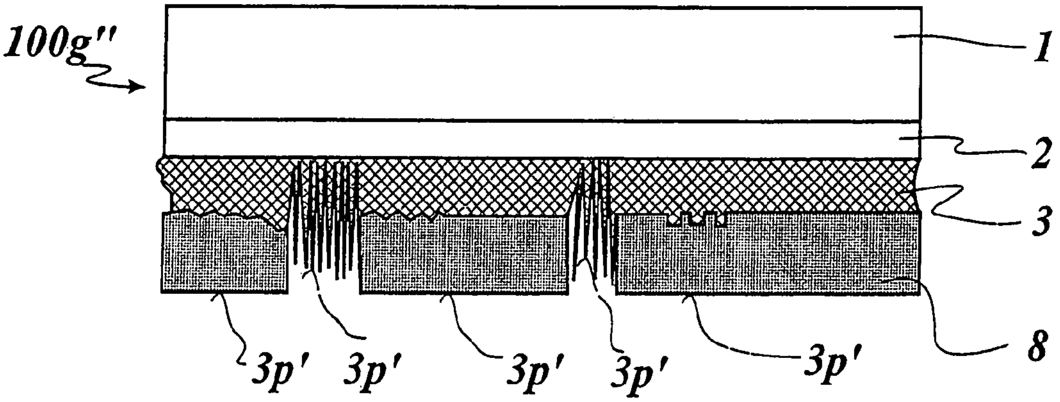
Figure 14D:
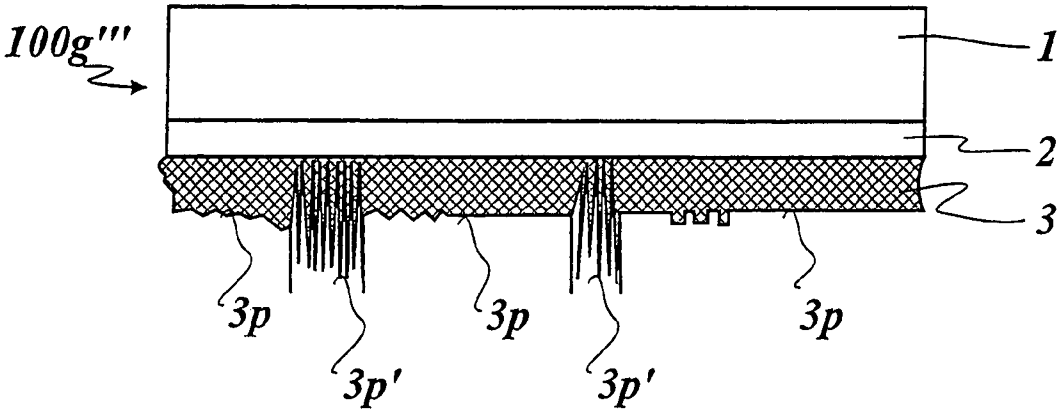

As the layers **3*p* and/or 3*p*' can be thin-layer systems, they can produce color change effects, as already described hereinbefore. In that respect it can be provided for example that the layer 3*p* which in the embodiment in FIG. 14*d* covers over the regions of the replication layer 3** with a high depth-to-width ratio is in the form of a thin-layer system. It is possible in that way for filigree patterns such as guilloche patterns to be in the form of security features which unobtrusively stand out from their surroundings and still clearly visibly show representations disposed therebeneath.

The process described with reference to FIGS. **14*a* through 14*d* can be used for applying further layers. Because the layers 3*p* and 3*p*' are thin layers of the order of magnitude of some μm or nm, the structures introduced into the replication layer 3 are retained so that for example it is possible to apply a further metallic layer which in the regions of the replication layer 3** with a high depth-to-width ratio is transparent. In that way the further metallic layer can be used as a mask layer which can be partially removed with the above-described process steps or which can be provided as a temporary intermediate layer in order to apply one or more non-metallic layers in accurate register relationship.

Figure 15:
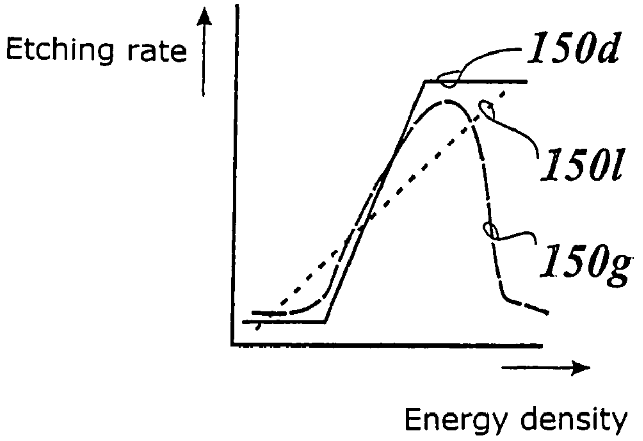
FIG. 15 shows a schematic diagram of etching rates of a photosensitive layer.

FIG. 15 now shows a diagrammatic graphic representation of two etching characteristics of developers which are intended for producing the etching mask from the photosensitive layer. The etching characteristics represent the etching rate, that is to say the removal of material per unit of time, in dependence on the energy density with which the photosensitive layer was exposed. A first etching characteristic **150*l*** is linear. Such an etching characteristic can be preferred if development is to be effected in accordance with time.

In general however a binary etching characteristic **150*b*** can be preferred because only minor differences are required in the energy density in order to produce a markedly different etching rate and in that way to implement complete removal of the mask layer in the regions involving a high depth-to-width ratio, with a high level of certainty.

A third etching characteristic **150*g*** involving a bell-shaped configuration which can be adjusted by the choice of the photoresist and the process implementation can be used in order to remove or obtain structures selectively in dependence on the transmission capability of the region.

Figure 16:
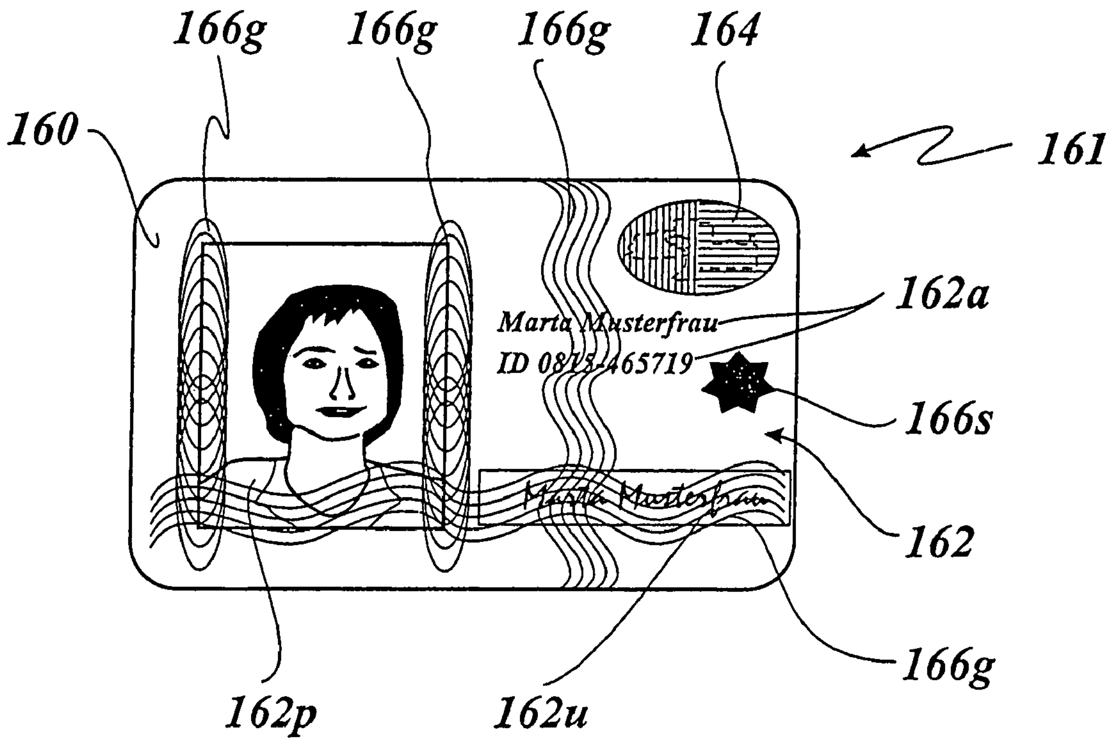
FIG. 16 shows an example of use of a multi-layer body according to the invention.

FIG. 16 now shows an example of use involving a multi-layer body 160 according to the invention. The multi-layer body 160 is arranged as a security feature on an ID card 161. It covers over on its complete surface area the front side of the ID card 161 which in this embodiment is in the form of a plastic card with a base layer 162 provided with a photograph **162*b* of the card holder, alphanumeric characters 162*a* which for example clan include personal details relating to the card holder and/or an ID number and a copy of the personal signature 162*u* of the card holder. In that respect it can also be provided that the base layer 162 is in the form of a layer of the multi-layer body 160**.

As shown in FIG. 16 the multi-layer body 160 has a metallic layer which includes a diffractive structure 164, reflecting structures **166*g* and 166*s* and transparent regions in which the metallic layer is removed. In the example of use shown in FIG. 16 the diffractive structure is a hologram, representing for example a corporate logo. The reflecting structures 166*g* cover over regions of the base layer 162 which are to be protected from forgery or falsification, in the form of guilloche patterns. Reflecting structures can also be in the form of decorative elements as is shown in FIG. 16 in the form of a star element 166*s***.

The invention claimed is:

1. A process for the production of a multi-layer body having a partially shaped first layer, the process comprising the steps of:

shaping a diffractive first relief structure having individual structure elements with a depth-to-width ratio of >0.3 in a first region of a replication layer of the multi-layer body;

applying the first layer to the replication layer in the first region and in a second region in which the first relief structure is not shaped in the replication layer, said first layer being applied with a constant surface density with respect to a plane defined by the replication layer, and wherein the diffractive relief structure in the first region influences physical properties of the first layer, so that the physical properties of the first layer differ in the first and second regions; and partially removing the first layer in a manner determined by the first relief structure so that the first layer is removed from only one of the first region or the second region.

2. A process as set forth in claim 1, wherein the first layer is exposed to an etching agent in an etching process both in the first region and also in the second region and the period of action of the etching agent is so selected that the first layer is removed in the first region but not in the second region.

3. A process as set forth in claim 1, wherein the first layer is applied to the replication layer with a surface density such that the transparency of the first layer in the first region is increased by the first relief structure with respect to transparency of the first layer in the second region.

4. A process as set forth in claim 3, wherein the replication layer is in the form of a photoactive washing mask, wherein the washing mask is exposed through the first layer and activated in the first region in which the transparency of the first layer is increased by the first relief structure and wherein the activated regions of the washing mask and the regions of the first layer which are arranged thereon are removed in a washing process.

5. A process as set forth in claim 3, wherein a photoactivatable layer is applied to the first layer, the photoactivatable layer is exposed through the first layer and activated in the first region in which the transparency of the first layer is increased by the first relief structure and the activated photoactivatable layer forms an etching agent for the first layer.

6. A process as set forth in claim 3, wherein a photosensitive layer is applied to the first layer, the photosensitive layer is exposed through the first layer and activated in the first region in which the transparency of the first layer is increased by the first relief structure, the photosensitive layer is developed so that the developed photosensitive layer forms an etching mask for the first layer and in an etching process the regions of the first layer, which are not covered by the etching mask, are removed.

7. A process as set forth in claim 6, wherein the photosensitive layer is formed from a photoresist.

8. A process as set forth in claim 7, wherein the photoresist is in the form of a positive photoresist.

9. A process as set forth in claim 7, wherein the photoresist is in the form of a negative photoresist.

10. A process as set forth in claim 6, wherein the photosensitive layer is in the form of a photopolymer.

11. A process as set forth in claim 3, wherein an absorption layer is applied to the first layer, the absorption layer is irradiated with laser light through the first layer and is thermally removed in the first region of the first layer, in which the transparency of the first layer is increased by the first relief structure, and the partially removed absorption layer forms an etching mask for the first layer.

12. A process as set forth in claim 6, wherein the residues of the etching masks are removed.

13. A process as set forth in claim 1, wherein a second layer is introduced into the regions in which the first layer has been removed.

14. A process as set forth in claim 13, wherein the partially shaped first layer is removed and replaced by a partially shaped third layer.

15. A process as set forth in claim 14, wherein the first layer and/or the second layer and/or the third layer are galvanically reinforced.

16. A process as set forth in claim 14, wherein a fourth layer is applied to the layers arranged on the replication layer with a surface density with respect to the plane defined by the replication layer such that the transparency of the fourth layer in the first region is increased by the first relief structure with respect to transparency of the fourth layer in the second region, and wherein the fourth layer is partially removed in a manner determined by the first relief structure so that the fourth layer is removed from only one of the first region or the second region.

17. A multi-layer body having a replication layer and at least one first layer partially arranged on the replication layer, wherein a diffractive first relief structure having individual structure elements with a depth-to-width ratio of the individual structure elements of >0.3 is shaped in a first region of the replication layer, the first relief structure is not shaped in the replication layer in a second region of the replication layer, and wherein the diffractive relief structure in the first region influences physical properties of the first layer, so that the physical properties of the first layer differ in the first and second regions, whereby the partial arrangement of the first layer is determined by the first relief structure, so that the first layer is removed from only one of the first region or the second region.

18. A multi-layer body as set forth in claim 17, wherein a second layer is arranged in the regions of the replication layer in which the first layer is not present.

19. A multi-layer body as set forth in claim 18, wherein the first layer and/or the second layer is/are formed from a metal or a metal alloy.

20. A multi-layer body as set forth in claim 18, wherein the first layer and/or the second layer is/are formed from a dielectric.

21. A multi-layer body as set forth in claim 20 wherein the first layer and the second layer have different refractive indices.

22. A multi-layer body as set forth in claim 18, wherein the first and/or the second layer is/are formed from a polymer.

23. A multi-layer body as set forth in claim 18, wherein the first layer and/or the second layer comprise a cholesteric liquid crystal material.

24. A multi-layer body as set forth in claim 18, wherein the first layer and/or the second layer is/are in the form of a colored layer.

25. A multi-layer body as set forth in claim 18, wherein the first layer and/or the second layer is/are formed from a plurality of partial layers.

26. A multi-layer body as set forth in claim 25, wherein the partial layers form a thin film layer system.

27. A multi-layer body as set forth in claim 25, wherein the partial layers are formed from different materials.

28. A multi-layer body as set forth claim 27, wherein the partial layers are formed from different metals and/or different metal alloys.

29. A multi-layer body as set forth in claim 25, wherein at least one of the partial layers is removed region-wise.

30. A multi-layer body as set forth in claim 18, wherein the first layer and/or the second layer forms/form an optical pattern.

31. A multi-layer body as set forth in claim 18, wherein the first layer and/or the second layer forms/form an exposure mask.

32. A multi-layer body as set forth in claim 18, wherein the first layer and/or the second layer forms/form an image mask.

33. A multi-layer body as set forth in claim 18, wherein the first layer and/or the second layer forms/form a raster image.

34. A multi-layer body as set forth in claim 17, wherein a second relief structure is produced in the second region, the second relief structure having a depth-to-width ratio less than the depth-to-width ratio of the first relief structure.

35. A multi-layer body as set forth in claim 18, wherein the first layer and/or the second layer forms at least one of an antenna, a capacitor, a coil or an organic semiconductor component.

36. A multi-layer body as set forth in claim 18, wherein the first layer and/or the second layer forms/form a partly transparent screening film in relation to electromagnetic radiation.

37. A multi-layer body as set forth in claim 18, wherein the first layer and/or the second layer form a liquid and/or gas analysis chip or a part thereof.

38. A multi-layer body as set forth in claim 17, wherein the replication layer and/or the first layer form an orientation layer for orientation of liquid crystals and the second layer is formed by a layer of a liquid crystal material.

39. A multi-layer body as set forth in claim 38 wherein the orientation layer has structures for orientation of the liquid crystals, which are locally differently oriented, so that considered under polarised light the liquid crystals represent an item of information.

* * * * *

UNITED STATES PATENT AND TRADEMARK OFFICE

CERTIFICATE OF CORRECTION

PATENT NO. : 7,821,716 B2
APPLICATION NO. : 11/883990
DATED : October 26, 2010
INVENTOR(S) : Staub et al.

It is certified that error appears in the above-identified patent and that said Letters Patent is hereby corrected as shown below:

Column 22, lines 65-67,

Claim 17 now reads "wherein a diffractive first relief structure having individual structure elements with a depth-to-width ratio of the individual structure elements of >0.3 is shaped in a first"

should read --wherein a diffractive first relief structure having individual structure elements with a depth-to-width ratio of >0.3 is shaped in a first--

Signed and Sealed this
Thirty-first Day of May, 2011

David J. Kappos
*Director of the United States Patent and Trademark Office*